United States Patent [19]

Johnson et al.

[11] Patent Number: 4,568,318
[45] Date of Patent: Feb. 4, 1986

[54] BELT TENSIONING APPARATUS FOR BELT/PULLEY DRIVE SYSTEM

[75] Inventors: Carl R. Johnson, Minneapolis; Ramon Pareja, Edina, both of Minn.

[73] Assignee: Lear Siegler, Inc., Santa Monica, Calif.

[21] Appl. No.: 709,336

[22] Filed: Mar. 7, 1985

Related U.S. Application Data

[63] Continuation of Ser. No. 450,127, Dec. 15, 1982, abandoned.

[51] Int. Cl.[4] .............................................. F16H 7/10
[52] U.S. Cl. .................................... 474/112; 474/114
[58] Field of Search ................ 474/101, 112, 113, 114

[56] References Cited

U.S. PATENT DOCUMENTS

| | | | |
|---|---|---|---|
| 844,892 | 2/1907 | Pfander | 474/112 |
| 1,166,979 | 1/1916 | Gallet | 474/113 |
| 1,323,490 | 12/1919 | Putnam | 474/112 |
| 1,742,874 | 1/1930 | Prescott | 474/112 |
| 1,797,531 | 3/1931 | Sandieson | 474/112 |
| 2,925,740 | 2/1960 | Chung | 474/112 |
| 3,863,517 | 2/1975 | Pareja | 474/112 |
| 4,138,901 | 2/1979 | Fortin et al. | 474/112 |
| 4,222,280 | 9/1980 | Stewart | 474/112 |

Primary Examiner—James A. Leppink
Assistant Examiner—Frank McKenzie
Attorney, Agent, or Firm—Orrin M. Haugen; Thomas J. Nikolai

[57] ABSTRACT

A mechanical drive mechanism of the endless belt and pulley type having an improved belt tensioning arrangement. The shaft of the machine being driven (or that of the driving member itself) is eccentrically journaled with respect to its cylindrical bearing hub and a rigid arm having a first bore therethrough is disposed with the hub of the machine centered in that first bore. Located at the opposed end of the rigid arm is a parallel bore in which the other drive or driven shaft is journaled. Because of the eccentricity between the first shaft and its hub, as the arm is rotated about the hub as a center, the distance between the centers of the driving and driven shafts is increased or decreased, depending upon the direction of rotation of the rigid arm. As such, the tension of the endless belt coupling the drive and driven pulleys can be varied. The construction of the belt and pulley combination lends itself to being completely enclosed in a protective shroud which need not be removed to make the tensioning adjustment.

4 Claims, 2 Drawing Figures

BELT TENSIONING APPARATUS FOR BELT/PULLEY DRIVE SYSTEM

This is a continuation of application Ser. No. 450,127, filed Dec. 15, 1982 now abandoned.

BACKGROUND OF THE INVENTION

This invention relates generally to belt and pulley drive mechanisms, and more specifically to an improved means whereby the tension of the belt can be adjusted.

Belt and pulley drive mechanisms have long been used in coupling a driving shaft such as that of an electric motor or other prime mover to a driven shaft such as that of a generator, fan or pump. In each of these applications, the driving and driven shafts are normally journaled for rotation by means of bearings or bushings. Proper tension must be maintained in the belt coupling the drive pulley to the driven pulley so that the belt will not slip, yet the tension must not be too great or the bearing/bushing life will be markedly reduced. Thus, a need exists whereby the tension of a V-belt or other flexible endless belt can be readily adjusted.

For exemplary purposes only and with no limitation intended, the present invention will be discussed in connection with its use in driving a centrifugal pump. It is to be understood, however, that the same approach may be used in a variety of other applications.

In U.S. Pat. No. 3,863,517 to Pareja entitled "Centrifugal Pump Mount" which is assigned to the assignee of the instant invention, there is described a belt tensioning arrangement in which the drive pulley is arranged to be driven by the power takeoff of an agricultural tractor while the driven pulley is coupled to the shaft of a centrifugal pump. In this arrangement, the drive pulley has a first bore extending inward on one side of its hub for receiving a motor's output shaft and a second or counterbore extending inward from the opposite side of its hub for receiving thrust bearings which are used to journal the drive pulley to a first end of a stub shaft. A bracket is bolted to the pump has a bore therein for receiving the other end of the stub shaft. The two ends of the stub shaft are offset by a predetermined eccentricity. Means are provided for adjusting the radial position of the stub shaft within the bore in the bracket. As the stub shaft is rotated in one direction or the other, the amount of eccentricity adds to or subtracts from the nominal distance between the driving shaft and the shaft of the driven centrifugal pump.

The present invention is deemed to be an improvement over the prior art as represented by the aforereferenced U.S. Pat. No. 3,863,517. While the arrangement disclosed in that earier patent is entirely workable and capable of achieving the objects and advantages set forth in that patent, when compared to the present invention, it proves to be relatively more costly to manufacture and slightly more difficult to repair and maintain. For example, the tensioning arrangement shown in the earier Pareja '517 patent requires an eccentric stub shaft which is relatively expensive to make. Also, rather than a conventional pulley, the earier device requires that the pulley have a counterbore for accommodating thrust bearings for supporting the stub shaft. The locking mechanism for the belt tensioning lever including the slotted cup housing and associated adjustable locking lever also result in a more costly approach. The belt tensioning approach set forth in the resent specifically offers a number of advantages over prior art other than that represented by the Pareja '517 patent. For example, many of the centrifugal pumps in use today require that the power takeoff (PTO) drive attachment be disassembled in order to remove the pump for servicing. With the mounting and belt tensioning arrangement of the present invention, however, by removing only a single bolt, the pump can be separated from the PTO drive hookup. It is found that the tensioning arrangement of the present invention provides a high resistance to slip with less bearing load and with little or no chatter or vibration. Furthermore, the design of the present invention tends to be lighter, more compact without sacrifice in the effective life of the assembly and its component parts.

It is accordingly a principal object of the present invention to provide a new and improved arrangement for adjusting and holding the tension of an endless belt in a belt and pulley drive system.

Another object of the invention is to provide an improved belt tensioning arrangement which offers the advantages of lower manufacturing cost, simplicity of adjustment, high reliability and greater ease of repair and maintenance than heretofore obtainable using prior art techniques.

SUMMARY OF THE INVENTION

The foregoing features and advantages of the invention result from a design in which a conventional driving pulley is mounted on a symmetrical stepped shaft which is journaled for rotation in a transversely extending cylindrical bore formed through a rigid arm member at a first end thereof. The opposite end of the arm is provided with a further cylindrical bore which is adapted to fit over a cylindrically turned hub portion of the case or housing of the machine to be driven which, as mentioned, may typically be a centrifugal pump. Disposed within this hub are the usual bearings supporting the shaft to which the pump's impeller is attached. The impeller shaft is mounted within the hub in an off-center or eccentric manner, i.e., it is not concentric with the centerline of the cylindrical hub in which it is journaled. Also formed at the end of the rigid arm to which the driven member (centrifugal pump) is disposed is an arcuate slot whose centerline is concentric with the centerline of the cylindrical hub. A single bolt passes through this arcuate slot and into a threaded bore formed in the pump's housing.

When an endless belt is disposed over the drive pulley journaled for rotation about the first end of the rigid arm and the driven pulley attached to the pump's impeller shaft, the tension in the belt may be adjusted (within limits) by simply loosening the single bolt somewhat and then rotating the rigid arm about the pump's hub as an axle. When this is done, the distance between the centerlines of the drive shaft and the driven shaft is either increased or decreased, depending upon the direction of rotation of the arm. When rotated in a first direction, the eccentricity adds to the nominal center-to-center distance between the drive shaft and the driven shaft whereas when the rigid arm is rotated in the opposite direction, the eccentricity subtracts from the distance. Once the desired tension has been established, it is only necessary to retighten the single bolt which then locks the rigid arm to the pump housing.

A further feature of the invention is the inclusion of a bilaterally symmetrical shroud arrangement whose two halves may be brought together about the drive pulley, the driven pulley and the belt joining the two, the two halves being bolted one to another and to the rigid arm. The shroud practically entirely shields any moving parts, adding to the safety of the overall system. It is to be further noted that the tension of the endless belt may be adjusted with the shroud in place. Also, the pump can be easily removed for servicing by merely removing the single bolt used to lock the pump to the arm and slipping the driven pulley free of the endless belt.

The foregoing features and advantages of the invention will become more apparent to those skilled in the art from the following detailed description of the preferred embodiment, especially when considered in conjunction with the accompanying drawings in which like numerals in the several views refer to corresponding parts.

DETAILED DESCRIPTION OF THE PREFERRED EMBODIMENT

Figure 1:
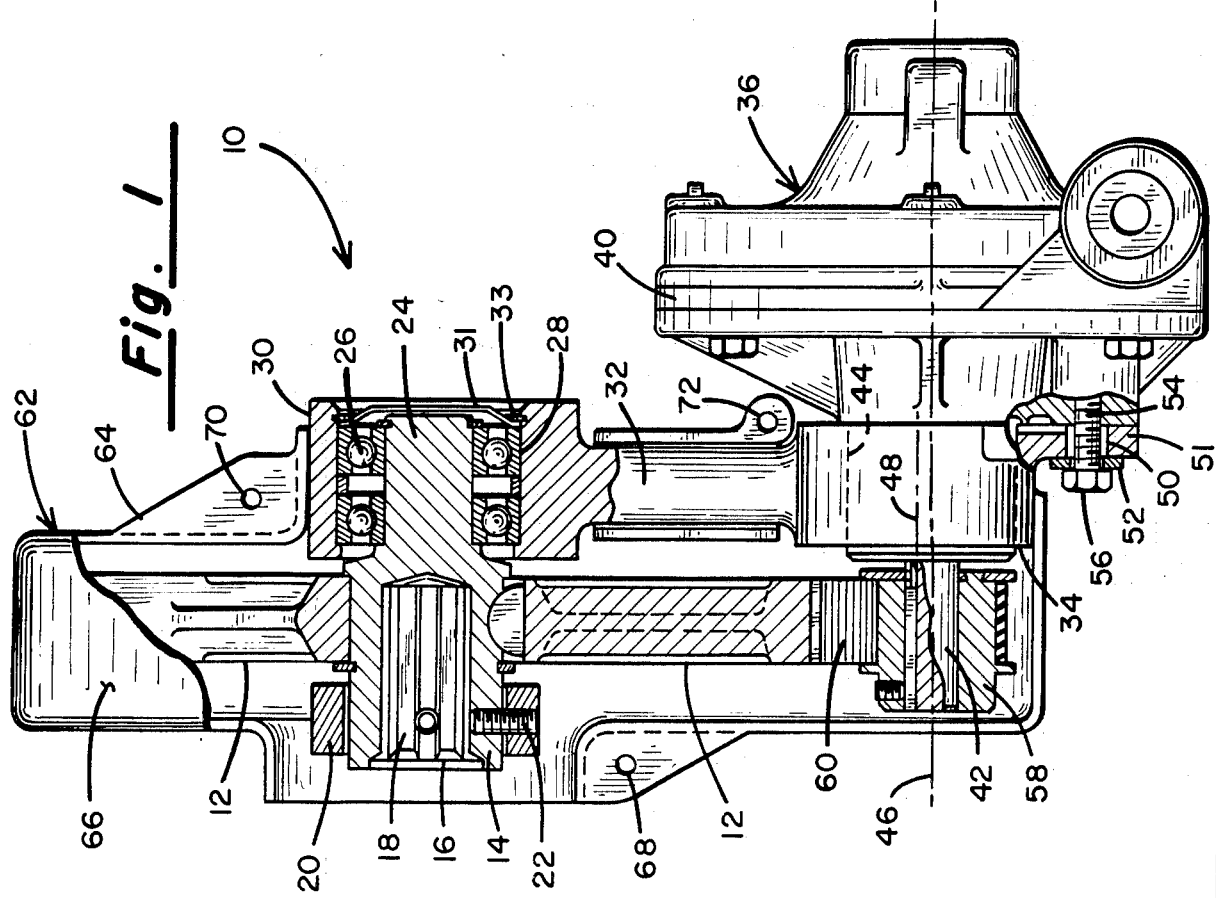
FIG. 1 is a partially cross-sectional side view illustrating the features of the invention.

Referring first to FIG. 1, the belt drive system of the present invention is indicated generally by numeral 10. It is shown as including a drive pulley 12 which is keyed to a stepped cylindrical stub shaft 14. The stub shaft 14 has an inwardly extending bore 16 and milled into this bore are regularly spaced recesses 18 adapted to accept the splines on a splined drive shaft (not shown). Surrounding the end portion of the grooved bore in the stub shaft 14 is a locking collar 20, the locking collar being the subject of U.S. Pat. No. 4,185,938 to Pareja, which is also assigned to the assignee of the present invention. As is described in that patent, by only a modest pressure on the set-screw 22, a relatively high force is applied to prevent the drive shaft from becoming loose in the splined bore 16. The stepped stub shaft 14 has an integrally formed cylindrical projection 24 which fits within suitable thrust-type ball bearing assemblies 26 which are contained within a bore 28 formed in a first end 30 of a rigid arm member 32. As such, the pulley 12 and its stub shaft 14 are free to rotate relative to the rigid arm member 32. A grease cap 31 held in place by a snap ring 33 seal the bearings from foreign matter.

Formed through the thickness dimension of the arm 32 at its lower end (when viewed as in FIG. 1) is a further cylindrical bore 34. The longitudinal axis of this bore is parallel to the axis of the stub shaft 14 when journaled within the bearings 26.

With continued reference to FIG. 1, the driven machine is indicated generally by numeral 36 and may, for example, comprise a centrifugal pump having a housing 40 surrounding an impeller (not shown) which is keyed to and rotatable with the pump's driven shaft 42. The shaft 42 is journaled in suitable bearings (not shown) contained within the cylindrical hub portion 44 of the pump housing 40. The diameter of the hub 44 is such that it slidingly fits within the bore 34 formed at the lower end of the rigid arm 32 and, as such, that arm can be rotated about the hub as its center. The pump's shaft 42, however, is eccentrically journaled within the hub 44 as is indicated by the spaced apart centerlines 46 and 48 with centerline 48 being that of the hub and centerline 46 being that of the shaft 42.

Figure 2:
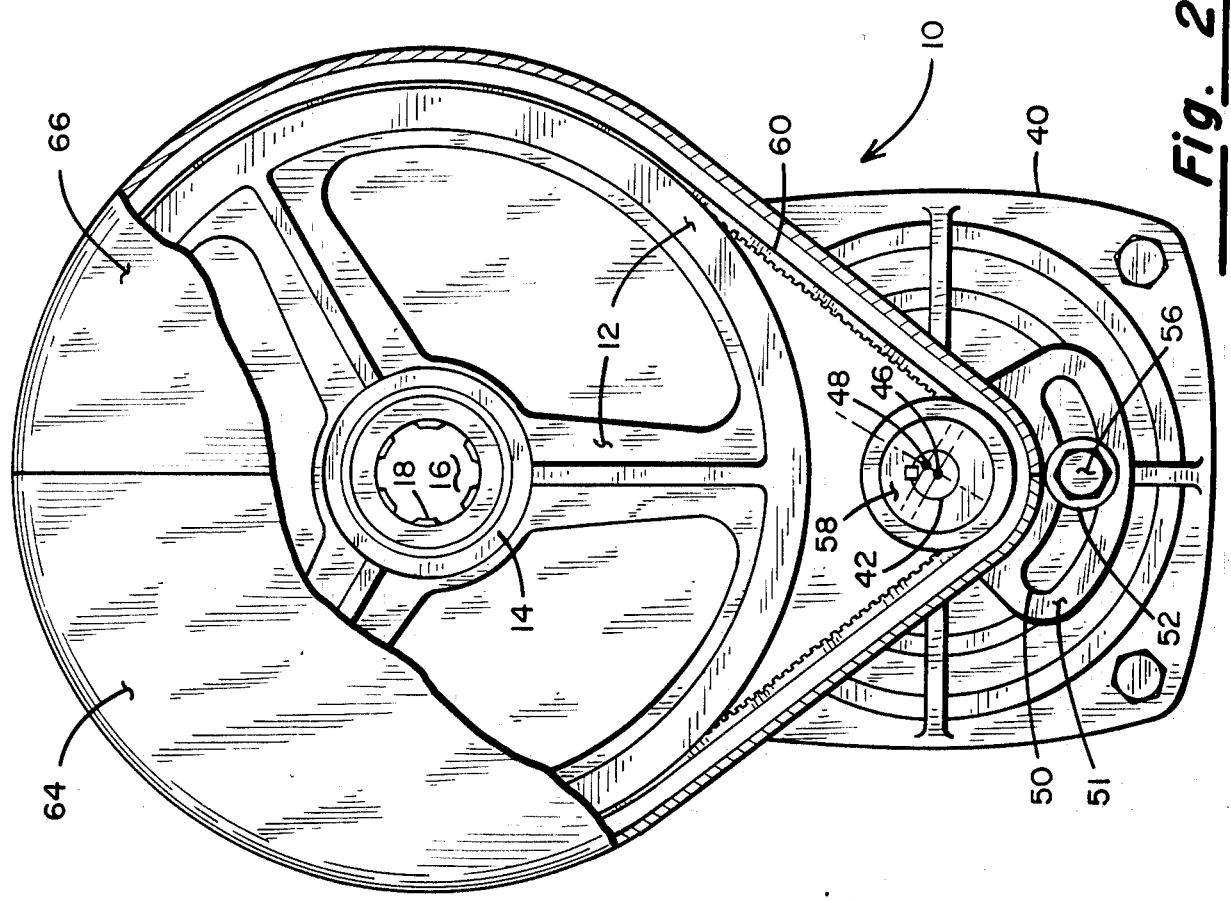
FIG. 2 is a frontal view with a portion of the shroud broken away for ease of viewing.

As can best be seen in FIG. 2, there is provided in the lower end of the rigid arm 32 a fan-shaped projection or flange 51 and an arcuate slot 50 extends completely through the thickness dimension of the flange, the notch subtending an angle of approximately 90 degrees. Passing through a washer 52 and the slot 50 and into a threaded bore 54 formed in the pump housing 40 is a locking bolt 56. The locking bolt 56 comprises the only means fastening the pump to the rigid arm 32.

Affixed to the pump's shaft is a driven pulley 58, and an endless belt 60 couples the drive pulley 12 to the driven pulley 58. The drive belt is selected so that when the arm 32 is rotated in a counterclockwise direction when viewed in FIG. 2 and the eccentricity between the hub 44 and the shaft 42 subtracts from the overall distance between the centers of the shafts 42 and 14, the belt will loosely fit over the edge flanges of the respective pulleys. Now, when the arm is again rotated in the clockwise direction when viewed in FIG. 2, the eccentricity between the center of the hub 44 and the pump's driven shaft 42 will add to the overall distance between the centers of the respective drive and driven shafts thus causing the belt to become taught. When a desired degree of tension is present in the belt, the bolt 56 is tightened down, holding the arm fixed relative to the pump housing and maintaining the preset belt tension.

As is indicated in the aforereferenced Pareja U.S. Pat. No. 3,863,517, the pump itself may be anchored to a frame by means of a chain or other suitable attachment means (not shown), thus preventing the pump and arm from spinning as the pulley 12 is driven by its associated prime mover (not shown).

The drive mechanism including the drive pulley 12, the belt 60 and the driven pulley 58 are enclosed within a removable shroud which is indicated generally by numeral 62 in FIG. 1. The shroud is a two-piece assembly including a left-half member 64 and a right-half member 66. These two halves may be brought together so as to substantially totally encase the moving parts of the drive system, the two halves being fastened together by means of bolts as at 68 and 70 and being fastened to the rigid arm 32 as at 72. When so configured, it can be seen that the locking bolt 56 is exposed so that it may be loosened while adjusting the belt tension and retightened without having to remove the shroud to do so. This feature adds considerably to the overall safety in that the operator is not tempted to remove the shroud while the pump is being driven.

The invention has been described herein in considerable detail in order to the comply with the Patent Statutes and to provide those skilled in the art with the information needed to apply the novel principles, and to construct and use such specialized compliments as are required. However, it is to be understood that the invention can be carried by specifically different equipment and devices, and that various modifications, both as to equipment details and operating procedures can be accomplished without departing from the scope of the invention itself.

What is claimed is:

1. In a mechanical drive system in which a drive pulley is coupled to a driven pulley by means of a flexible endless belt, apparatus for adjusting the tension of such belt, comprising:
    (a) a machine housing including an integrally formed, stationary, cylindrical hub portion centered on a first axis;

(b) a first cylindrical shaft having a longitudinal centerline, said first shaft being journaled for rotation in said cylindrical hub of said housing with said first axis being parallel to and offset from said longitudinal centerline of said shaft;

(c) a first pulley affixed to said first shaft;

(d) a rigid arm member having first and second parallel and spaced apart bores extending therethrough, said first bore being of a diameter to receive said cylindrical hub portion of said housing therein with a predetermined sliding fit therebetween whereby said rigid arm may be rotated about said hub to a desired angular position;

(e) a second shaft journaled for rotation in said second bore;

(f) a second pulley affixed to said second shaft;

(g) a flexible endless belt coupling said first and second pulleys; and (h) means including an arcuate slot of a constant radius formed through said arm, the center of curvature for said arcuate slot being concentric with said first axis of said hub, and a locking bolt passing through said slot into a threaded bore in said housing for attaching said macine to said arm and adjustably fixing the angular position of said arm on said cylindrical hub portion of said housing.

2. The apparatus as in claim 1 wherein said machine comprises a centrifugal pump.

3. The apparatus as in claim 2 and further including means for coupling said second pulley to a rotatable drive shaft.

4. The apparatus as in claim 1 and further including a shroud member affixed to said rigid arm member and substantially surrounding said first pulley, said second pulley and said endless belt while leaving said locking bolt exposed.

* * * * *